(12) United States Patent
Guo et al.

(10) Patent No.: US 10,584,925 B2
(45) Date of Patent: Mar. 10, 2020

(54) STACKED PLATE HEAT EXCHANGER WITH FORM FITTING CONNECTION OF THE PLATES

(71) Applicant: ZEHNDER GROUP INTERNATIONAL AG, Granichen (CH)

(72) Inventors: Zhangeng Guo, Beijing (CN); Hongwei Ran, Beijing (CN)

(73) Assignee: Zehnder Group International AG, Granichen (CH)

( * ) Notice: Subject to any disclaimer, the term of this patent is extended or adjusted under 35 U.S.C. 154(b) by 0 days.

(21) Appl. No.: 15/762,591

(22) PCT Filed: Sep. 22, 2016

(86) PCT No.: PCT/IB2016/055658
§ 371 (c)(1),
(2) Date: Mar. 23, 2018

(87) PCT Pub. No.: WO2017/051341
PCT Pub. Date: Mar. 30, 2017

(65) Prior Publication Data
US 2018/0266774 A1    Sep. 20, 2018

(30) Foreign Application Priority Data

Sep. 25, 2015  (CN) .......................... 2015 1 0623924

(51) Int. Cl.
*F28D 9/00* (2006.01)
*F28F 3/10* (2006.01)
(52) U.S. Cl.
CPC .............. *F28F 3/10* (2013.01); *F28D 9/0037* (2013.01); *F28F 2250/106* (2013.01); *F28F 2275/085* (2013.01); *F28F 2275/14* (2013.01)

(58) Field of Classification Search
CPC .............. F28D 9/0037; F28F 2275/085; F28F 2275/10
See application file for complete search history.

(56) References Cited

U.S. PATENT DOCUMENTS

| 5,775,410 A | * | 7/1998 | Ramm-Schmidt ....... B01D 1/22 165/110 |
| 2006/0196649 A1 | * | 9/2006 | Shibata ................. F28D 9/0037 165/166 |

(Continued)

FOREIGN PATENT DOCUMENTS

| CN | 104215103 B | 12/2014 | | |
| JP | 03279793 A | * | 12/1991 | ........... F28D 9/0062 |

(Continued)

*Primary Examiner* — Allen J Flanigan
(74) *Attorney, Agent, or Firm* — Maxwell L. Minch; GrayRobinson, P.A.

(57) ABSTRACT

The present invention provides a heat exchanger, comprising a plurality of first heat exchange plates (1) and second heat exchange plates (2) that are connected sequentially and at an interval; the first heat exchange plates (1) and the second heat exchange plates (2) each comprise a heat exchange sheet (3) and a heat exchange frame (4) disposed on side ends of the heat exchange sheet (3); the side ends of the heat exchange sheet (3) are formed with a snap projection (9) in a direction away from the heat exchange frame (4); the heat exchange frame (4) is formed with a snap groove (10); the first heat exchange plates (1) and the second heat exchange plates (2) are in interference connection through the engagement between the snap projection (9) and the snap groove (10); an air channel (5, 6) is formed between a first heat exchange plate (1) and an adjacent second heat exchange plate (2), the air inlet of the first heat exchange plate (1) and the air inlet of the second heat exchange plate (2) have different directions, and the air outlet of the first heat exchange plate (1) and the air outlet of the second heat (Continued)

exchange plate (2) have different directions. The present invention puts the first heat exchange plate (1) and the second heat exchange plate (2) in interference connection through the engagement between the snap projection (9) and the snap groove (10), which effectively ensures stability and reliability of the connection, and ensures the airtightness of the connection.

11 Claims, 6 Drawing Sheets

(56) References Cited

U.S. PATENT DOCUMENTS

| | | |
|---|---|---|
| 2007/0221366 A1 | 9/2007 | Murayama et al. |
| 2009/0032232 A1 | 2/2009 | Murayama |
| 2009/0114369 A1 | 5/2009 | Kammerzell |
| 2011/0120693 A1* | 5/2011 | Kammerzell ......... F24F 5/0035 165/201 |
| 2016/0298911 A1 | 10/2016 | Wang et al. |

FOREIGN PATENT DOCUMENTS

| | | | |
|---|---|---|---|
| JP | 3279793 | B2 | 4/2002 |
| JP | 3286995 | B2 | 5/2002 |

\* cited by examiner

STACKED PLATE HEAT EXCHANGER WITH FORM FITTING CONNECTION OF THE PLATES

FIELD OF THE INVENTION

The present invention relates to a heat exchanger, and in particular to a heat exchanger for gases.

DESCRIPTION OF THE RELATED ART

As energy-saving and emission-reduction policies are implemented, buildings have better and better airtightness, and indoor ventilation has become a necessary condition; to save energy and provide comfort, ventilation devices with heat recovery and purification capabilities are very popular on the market.

Existing heat exchangers comprise a plurality of heat exchange units, and heat exchange units are in sealed connection with each other through a bonding agent or sealing strip to form a set of air channels in the same fixed direction.

In the process of implementing the technical solution according to the present invention, however, the inventor found that the existing heat exchanger installation structure performs sealed connection through a bonding agent or sealing strip, leading to complex operations, and in the installation process, the sealing glue tends to leak or the sealing strip tends to move, making it impossible to ensure the sealing effect of the installation. As a result, the use effect of the device is weakened, and the overall appearance of the device is affected, which is not favorable for market promotion and applications.

SUMMARY OF THE INVENTION

The present invention provides a heat exchanger, for solving the problem of the prior art that sealed connection is achieved through a bonding agent or sealing strip, leading to complex operations, and in the installation process, the sealing glue tends to leak or the sealing strip tends to move, making it impossible to ensure the sealing effect of the installation, consequently weakening the use effect of the device, affecting the overall appearance of the device, and making it unfavorable for market promotion and applications.

The present invention provides a heat exchanger, comprising a plurality of first heat exchange plates and second heat exchange plates that are connected sequentially and at an interval;

The first heat exchange plates and the second heat exchange plates each comprises a heat exchange sheet and a heat exchange frame disposed on side ends of the heat exchange sheet, an air inlet and an air outlet being formed, respectively, on the heat exchange frame;

The side ends of the heat exchange sheet are formed with a matching snap projection in a direction away from the heat exchange frame;

The heat exchange frame is formed with a snap groove for matching with the snap projection;

The first heat exchange plates and the second heat exchange plates are in interference connection through the engagement between the snap projection and the snap groove;

An air channel is formed between a first heat exchange plate and an adjacent second heat exchange plate, the air inlet of the first heat exchange plate and the air inlet of the second heat exchange plate have different directions, and the air outlet of the first heat exchange plate and the air outlet of the second heat exchange plate have different directions According to the heat exchanger, the air inlet and the air outlet of the first heat exchange plate have the same direction, or the air inlet and the air outlet of the first heat exchange plate have different directions.

According to the heat exchanger, the first heat exchange plate is provided with a number of guide grates, said number of guide grates are connected to the air inlet and the air outlet, respectively, to form a plurality of linear channels between the air inlet and the air outlet.

According to the heat exchanger, the first heat exchange plate is provided with a number of guide grates, said number of guide grates are connected to the air inlet and the air outlet, respectively, to form a plurality of winding channels between the air inlet and the air outlet.

According to the heat exchanger, the air inlet and the air outlet of the second heat exchange plate have the same direction, or the air inlet and the air outlet of the second heat exchange plate have different directions.

According to the heat exchanger, the second heat exchange plate is provided with a number of guide grates, said number of guide grates are connected to the air inlet and the air outlet, respectively, to form a plurality of linear channels between the air inlet and the air outlet.

According to the heat exchanger, the second heat exchange plate is provided with a number of guide grates, said number of guide grates are connected to the air inlet and the air outlet, respectively, to form a plurality of winding channels between the air inlet and the air outlet.

According to the heat exchanger, the air inlet of the first heat exchange plate and the air inlet of the second heat exchange plate form a 90° angle, and the air outlet of the first heat exchange plate and the air outlet of the second heat exchange plate form a 90° angle.

According to the heat exchanger, the first heat exchange plate and the second heat exchange plate each comprises a square heat exchange plate, a rectangular heat exchange plate, a rhombic heat exchange plate and a hexagonal heat exchange plate.

The heat exchanger according to the present invention puts the first heat exchange plate and the second heat exchange plate in interference connection through the engagement between the snap projection and the snap groove, which effectively ensures stability and reliability of the connection, ensures the airtightness of the connection, reduces the operating complexity due to sealing through a sealing glue or sealing strip according to the prior art, and avoids the situation in which the device appearance becomes unsightly due to the leakage of the sealing glue or movement of the sealing strip. In addition, the air inlet and the air outlet of the first heat exchange plate are set to be in different directions than those of the air inlet and the air outlet of the second heat exchange plate, which effectively ensures that the air of different qualities in different areas flows in different air channels, is healthy and environmentally friendly, effectively improves the practicability of the device, and is favorable for market promotion and applications.

wherein:

| | |
|---|---|
| 1. first heat exchange plate; | 2. second heat exchange plate; |
| 3. heat exchange sheet; | 4. heat exchange frame; |
| 5. first air channel; | 6. second air channel; |
| 7. guide grates; | 8. first folding edge; |
| 9. snap projection | 10. snap groove; |
| 11. first frame; | 12. second frame; |
| 13. second folding edge. | |

DETAILED DESCRIPTION OF THE SPECIFIC EMBODIMENTS

Specific implementation of the present invention will be further described in detail below with reference to the accompanying drawings and examples. The following examples are used to describe the present invention, not to limit the scope of the present invention.

In the present invention, terms, "first" and "second", are only used for the purpose of description, which may not be construed as indication or implication of relative importance; terms like "installation" and "connection" shall be construed in a broad sense, unless otherwise specifically stipulated and defined, for example, "connection" may be a fixed connection, a removable connection, or an integral connection. To those skilled in the art, specific meanings of the above terms herein may be understood according to specific situations.

Figure 1:
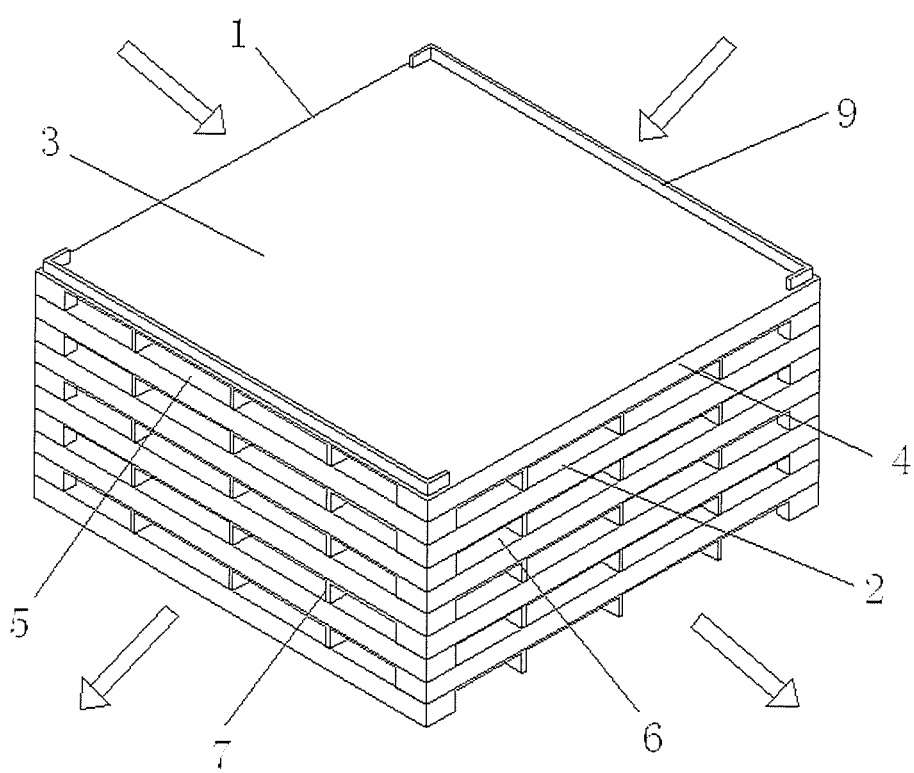
FIG. 1 is a schematic diagram of the structure of the heat exchanger in Example 1 of the present invention.
Figure 2:
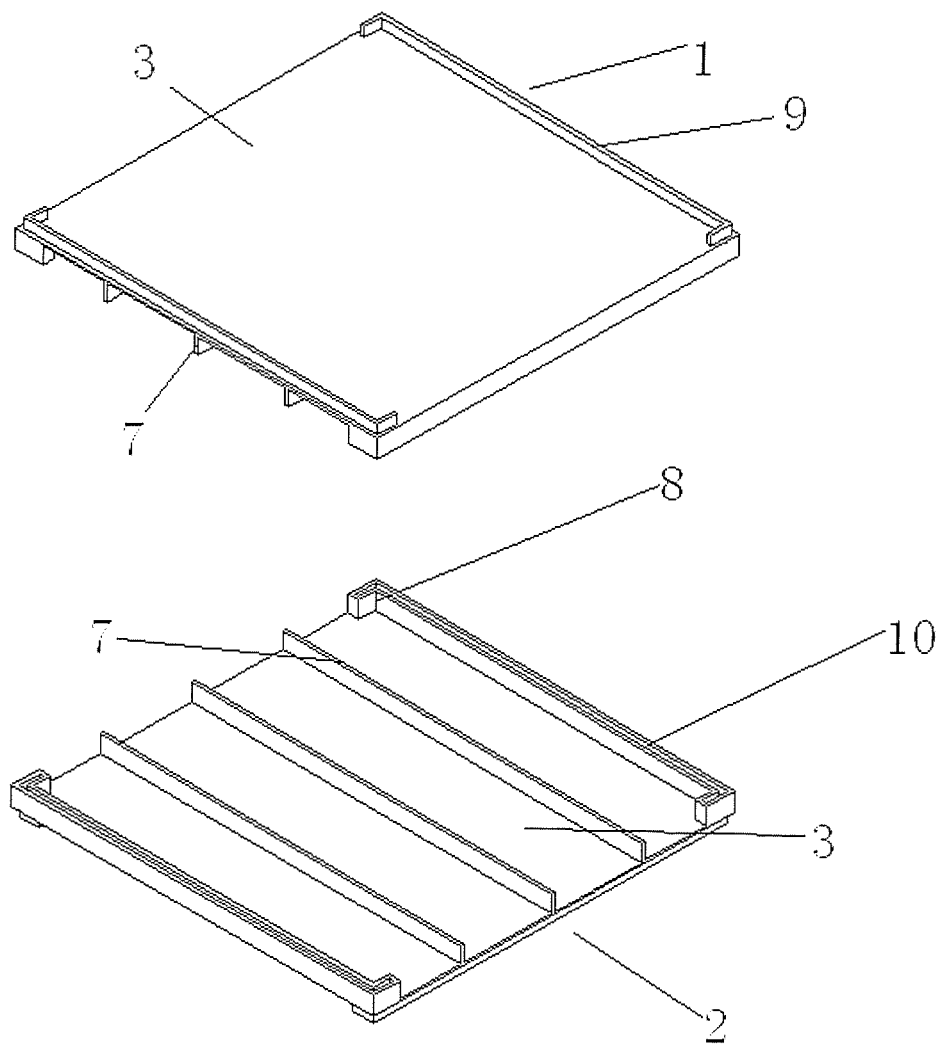
FIG. 2 is an exploded view of the structure of the connection between the first heat exchange plate and the second heat exchange plate according to the present invention.
Figure 3:
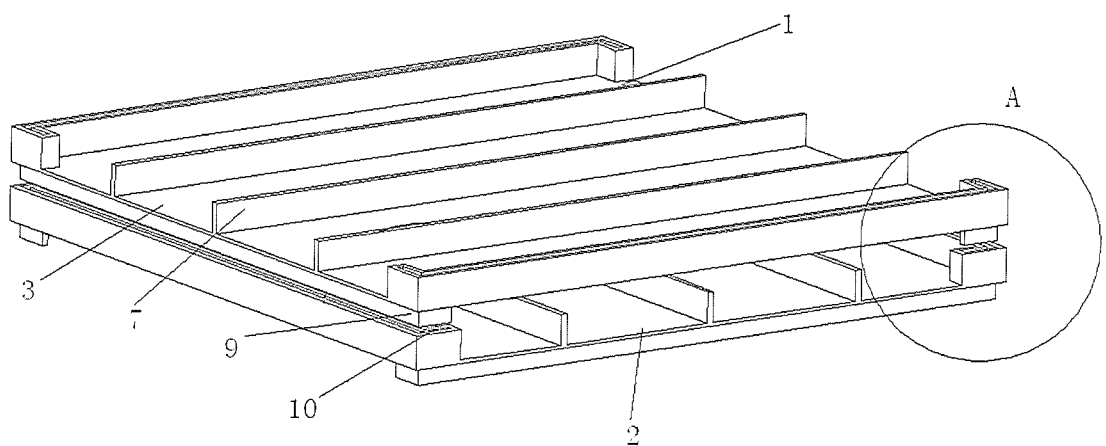
FIG. 3 is a schematic diagram of the structure of the connection between the first heat exchange plate and the second heat exchange plate according to the present invention.
Figure 4:
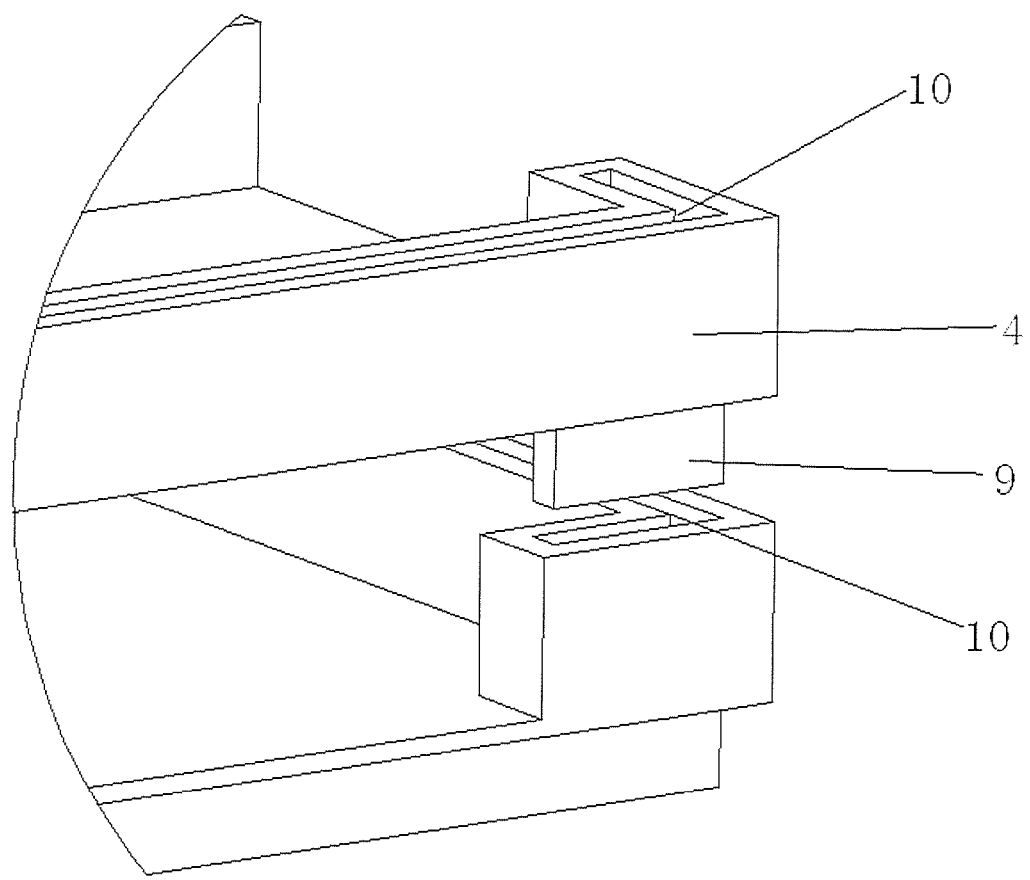
FIG. 4 is a partially enlarged view of Location A in FIG. 3.

FIG. 1 is a schematic diagram of the structure of a heat exchanger; FIG. 2 is an exploded view of the structure of the connection between the first heat exchange plate and the second heat exchange plate; referring to FIGS. 1 to 2, it can be seen that the present invention provides a heat exchanger, comprising a plurality of first heat exchange plates 1 and second heat exchange plates 2 that are connected sequentially and at an interval;

The first heat exchange plates 1 and the second heat exchange plates 2 each comprises a heat exchange sheet 3 and a heat exchange frame 4 disposed on side ends of the heat exchange sheet 3, an air inlet and an air outlet being formed, respectively, on the heat exchange frame 4 for the air to enter and exit, respectively;

The side ends of the heat exchange sheet 3 are formed with a matching snap projection 9 in a direction away from the heat exchange frame 4;

The heat exchange frame 4 is formed with a snap groove 10 for matching with the snap projection 9;

The first heat exchange plates 1 and the second heat exchange plates 2 are in interference connection through the engagement between the snap projection 9 and the snap groove 10;

An air channel is formed between a first heat exchange plate 1 and an adjacent second heat exchange plate 2, the air inlet of the first heat exchange plate 1 and the air inlet of the second heat exchange plate 2 have different directions, and the air outlet of the first heat exchange plate 1 and the air outlet of the second heat exchange plate 2 have different directions. Wherein, the number and shape of the first heat exchange plate 1 and the second heat exchange plate 2 are not specifically defined, which may be arbitrarily set by those skilled in the art according to application need and application space, for example, the number is 4, 5 or 6 for either the first heat exchange plate 1 or the second heat exchange plate 2, and the shape thereof is square, rectangular, rhombic, hexagonal or octagonal; moreover, the structure is the same for the first heat exchange plate 1 and the second heat exchange plate 2, they are connected through mutual snap between the snap projection 9 on the first heat exchange plate 1 and the snap projection 10 on the second heat exchange plate 2, which then effectively ensures the sealed connection between the first heat exchange plate 1 and the second heat exchange plate 2; for one heat exchange plate, the snap projection 9 and the snap projection 10 are disposed on two sides of the heat exchange sheet 3 away from each other, i.e. the top and bottom sides, respectively such that the projection and groove extending from opposite sides are not coextensive as seen in FIGS. 3 and 4; in a specific installation of the most common square structure, one of the heat exchange plates is rotated horizontally by 90°, and then the rotated heat exchange plate is treated as the second heat exchange plate 2 for snap connection with the other heat exchange plate through engagement between the snap projection 9 and the snap projection 10, such that an air channel is formed between the connected heat exchange plates, directions of the air inlet and the air outlet of the air channel are not specifically defined, as long as it can be ensured that the air inlet and the air outlet of the first heat exchange plate 1 all have different directions than those of the air inlet and the air outlet of the second heat exchange plate 2; the specific relation between the direction of an air inlet and the direction of an air outlet is related to the shape of heat exchange plates and the heat exchange frame 4, which may be set up by those skilled in the art according to design requirements and will not be described herein; in addition, the number of air channels formed between the heat exchange plates is not specifically defined, those skilled in the art may set to form a plurality of air channels, as long as they satisfy the condition that air inlets and air outlets of the formed first air channel 5 and second air channel 6 all have different directions, which will not be described herein.

The heat exchanger according to the present invention puts the first heat exchange plates 1 and the second heat exchange plates 2 in interference connection through the engagement between the snap projection 9 and the snap groove 10, which effectively ensures stability and reliability of the connection, ensures the airtightness of the connection, reduces the operating complexity due to sealing through a sealing glue or sealing strip according to the prior art, and avoids the situation in which the device appearance becomes unsightly due to the leakage of the sealing glue or movement of the sealing strip. In addition, the air inlet and the air outlet of the first heat exchange plate 1 are set to be in different directions than those of the air inlet and the air outlet of the second heat exchange plate 2, which effectively ensures that the air of different qualities in different areas flows in different air channels, is healthy and environmentally friendly, effectively improves the practicability of the device, and is favorable for market promotion and applications.

On the basis of the above example, it can be seen by continuing to refer to FIGS. 1 to 2 that a variety of scenarios exists for directions of the air inlet and the air outlet of the first heat exchange plate 1, i.e. a scenario in which the air inlet and the air outlet of the first heat exchange plate 1 have the same direction, or a scenario in which the air inlet and the air outlet of the first heat exchange plate 1 have different directions, wherein the above two scenarios each comprises a variety of varying structures, including:

The first heat exchange plate 1 is provided with a number of guide grates 7, said number of guide grates 7 are connected to the air inlet and the air outlet, respectively, to form a plurality of linear channels between the air inlet and the air outlet; linear channels are formed between the air inlet and the air outlet through the guide grates 7, such that the air inlet and the air outlet have the same direction;

Alternatively, the first heat exchange plate 1 is provided with a number of guide grates 7, said number of guide grates 7 are connected to the air inlet and the air outlet, respectively, to form a plurality of winding channels between the air inlet and the air outlet, winding channels are formed between the air inlet and the air outlet through the guide grates 7, such that the air inlet and the air outlet have different directions, wherein, when the shape of the guide grate 7 is an L-like structure, the air inlet and the air outlet connected to two ends of the guide grate 7 form a 90° angle, such that the air inlet and the air outlet of the first heat exchange plate 1 form a 90° angle, wherein, for the above situation that the air inlet and the air outlet of the first heat exchange plate 1 form a 90° angle, the shape of the guide grate 7 is not limited to the L-like structure, those skilled in the art may also use a guide grate 7 of other shape and structure, which will not be described herein.

Moreover, a variety of scenarios also exists for directions of the air inlet and the air outlet of the second heat exchange plate 2, i.e. a scenario in which the air inlet and the air outlet of the second heat exchange plate 2 have the same direction, or a scenario in which the air inlet and the air outlet of the second heat exchange plate 2 have different directions, wherein the above two scenarios each comprises a variety of varying structures, including:

The second heat exchange plate 2 is provided with a number of guide grates 7, said number of guide grates 7 are connected to the air inlet and the air outlet, respectively, to form a plurality of linear channels between the air inlet and the air outlet; linear channels are formed between the air inlet and the air outlet through the guide grates 7, such that the air inlet and the air outlet have the same direction;

Alternatively, the second heat exchange plate 2 is provided with a number of guide grates 7, said number of guide grates 7 are connected to the air inlet and the air outlet, respectively, to form a plurality of winding channels between the air inlet and the air outlet, winding channels are formed between the air inlet and the air outlet through the guide grates 7, such that the air inlet and the air outlet have different directions, wherein, when the shape of the guide grate 7 is an L-like structure, the air inlet and the air outlet connected to two ends of the guide grate 7 form a 90° angle, such that the air inlet and the air outlet of the second heat exchange plate 2 form a 90° angle, wherein, for the above situation that the air inlet and the air outlet of the second heat exchange plate 2 form a 90° angle, the shape of the guide grate 7 is not limited to the L-like structure, those skilled in the art may also use a guide grate 7 of other shape and structure, which will not be described herein.

Wherein, for the above structures that set the directions of the air inlets and the air outlets of the first heat exchange plate 1 and the second heat exchange plate 2, either structural combination can effective achieve the effect that the air inlets and the air outlets of the first heat exchange plate 1 and the second heat exchange plate 2 have different directions, more preferably, the air inlet of the first heat exchange plate 1 and the air inlet of the second heat exchange plate 2 are made to form a 90° angle, and the air outlet of the first heat exchange plate 1 and the air outlet of the second heat exchange plate 2 are made to form a 90° angle; there is a variety of specific ways to implement the above structure, which effectively improve the practicability and applicable range of the device. In a specific application, those skilled in the art may, according to specific construction need, set the air inlets and the air outlets of the first heat exchange plate 1 and the second heat exchange plate 2 to be in opposite directions, as long as it can achieve the effect that the air inlets and the air outlets have different directions, which will not be described herein.

In a specific design, the heat exchange sheet 3 is evenly provided with a number of guide grates 7, the guide grates 7 are disposed between the heat exchange frames 4 on the two sides thereof and are connected to the air inlet and the air outlet, and with the guide grates 7, a number of first air channels 5 and second air channels 6 are formed between the heat exchange frame 4 of the first heat exchange plates 1 and the second heat exchange plate 2 and between the first heat exchange plates 1 and the heat exchange frame 4 of the second heat exchange plate 2.

Wherein, the specific structure and quantity of the guide grates 7 are not specifically defined, and the specific number of the guide grates 7 is related to the size and internal pressure of the heat exchange sheet 3; specifically, the heat exchange sheet 3 is formed by a heat exchange thin film, due to its extremely small thickness, the guide grates 7 are provided on the heat exchange sheet 3, and the guide grates 7 effectively play a support role for the heat exchange sheet 3 in addition to guiding the circulating air. With respect to the support role played by the guide grates 7, the structure of the guide grates 7 is not specifically defined, and the guide grates 7 may be set to have a uniform height and the height is similar to the height of the heat exchange frames 4; alternatively, the guide grates 7 may be set to have irregularly varying heights, while the specific varying structure is not defined, which may be set by those skilled in the art according to the design need, as long as it can satisfy the condition that an air channel is formed by the heat exchange sheet 3 and another heat exchange sheet 3 connected to said heat exchange sheet 3 through the guide grates 7, which will not be described herein; moreover, those skilled in the art may set the quantity of the guide grates 7 according to the number of preset air channels, for example, if the number of air channels is three, then the number of the guide grates 7 is two; if the number of air channels is four, then the number of the guide grates 7 is three, etc.; the present application uses an example, in which the number of the guide grates 7 is set to 3, for description, and correspondingly, the number of the first air channels and the second air channels is 4; by using the above number of the guide grates 7, it not only can effectively ensure that the overall appearance of the device is beautiful and elegant, but also guarantees the spatial area of each air channel and ensures the effective flowability of the air; moreover, the way in which a number of first air channels 5 and second air channels 6 are formed through the guide grates 7 is simple and convenient, and is easy to implement. Those skilled in the art may simply and quickly implement a plurality of air channels, which effectively ensures the installation efficiency and saves the time cost.

FIG. 3 is a schematic diagram of the structure of the connection between the first heat exchange plate and the second heat exchange plate; FIG. 4 is a partially enlarged view of Location A in FIG. 3; it can be seen by continuing to refer to FIGS. 1 to 4 that the shape of the heat exchange sheet 3 is set to be square; by setting the shape of the heat exchange sheet 3 to be square, the first heat exchange plate 1 and the second heat exchange plate 2 have a symmetric structure, which facilitates installation, saves the time cost, effectively improves the installation efficiency, and during a specific use, the shape is regular, and the overall structure is easy to install, the applicable range is wide, and the practicability of the device is effectively improved.

It can be seen by continuing to refer to FIGS. 1 to 4 that the heat exchange frame 4 comprises a frame and first folding edges 8 symmetrically disposed at two ends of the frame, and the first folding edges 8 are perpendicular to the frame; in the situation that the shape of the heat exchange sheet 3 is square, the shape of the heat exchange frame 4 matches with the side end of the heat exchange sheet 3, such that the overall structure of the heat exchange frame 4 is a U-like structure.

By setting the heat exchange frame 4 to be a structure comprising a frame and the first folding edges 8, it can effectively realize the protection of the side ends and corners of the heat exchange sheet 3, and when the heat exchange frame 4 has a U-like structure, the snap groove 10 disposed on the heat exchange frame 4 also has a U-like structure, the snap projection 9 correspondingly has a U-like structure as well, the employment of the snap groove 10 and the snap projection 9 having such a structure can effectively ensure the stability and reliability of connection, ensure the airtightness and stability of connection, and prevent the sides and corners of the heat exchange sheet 3 from being damaged, which effectively improves the safety and reliability of the device use.

On the basis of the above example, it can be seen by continuing to refer to FIGS. 1 to 4 that, in the situation that the heat exchange sheet 3 is a square heat exchange sheet and when a plurality of linear channels is formed between the air inlet and the air outlet by the guide grates 7, the first air channels 5 and the second air channels 6 formed between the first heat exchange plate 1 and the second heat exchange plate 2 are perpendicular to each other, namely the preset angle formed by the first air channels 5 and the second air channels 6 is 90°.

In the situation that the heat exchange sheet 3 is square, it is easy to realize that two air channels are set to be perpendicular to each other, so as to match with the shape of the heat exchange sheet 3, and the formation of two perpendicular air channels can effectively ensure that two air flows in different directions and of different qualities circulate in different air channels, to further realize energy exchange, and in the above process of energy exchange, it effectively ensures that the air is environmentally friendly and clean, which is favorable for people's physical and mental health.

Figure 5:
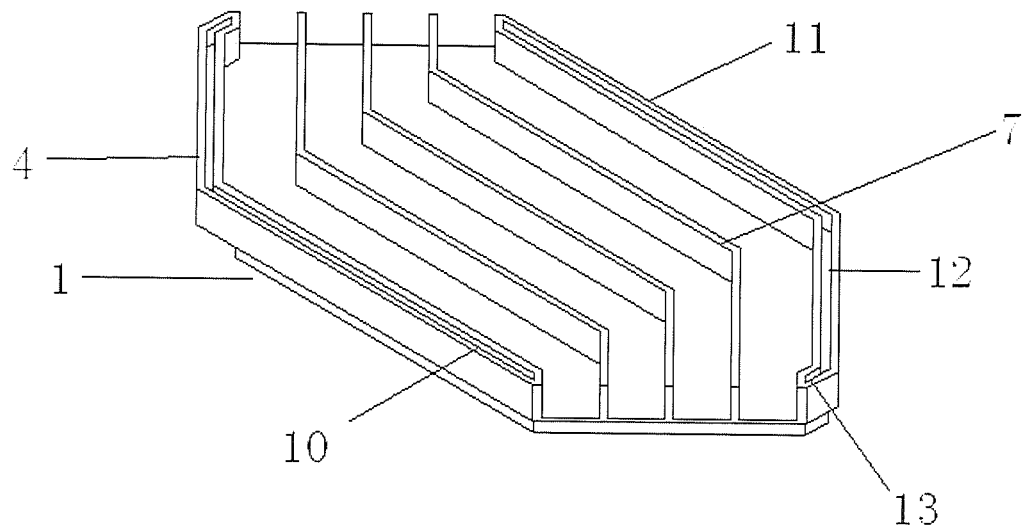
FIG. 5 is a schematic diagram I of the structure of the first heat exchange plate in Example 2 according to the present invention.
Figure 6:
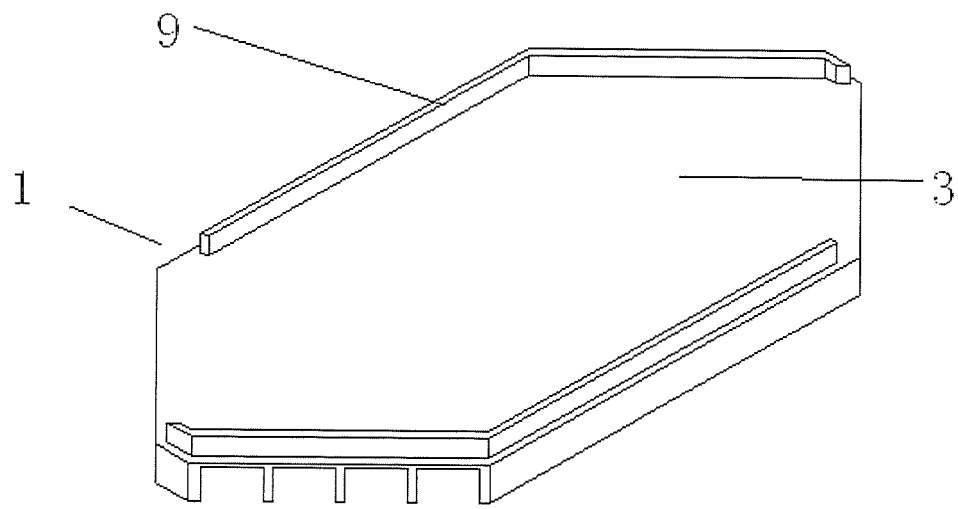
FIG. 6 is a schematic diagram II of the structure of the first heat exchange plate in Example 2 according to the present invention.
Figure 7:
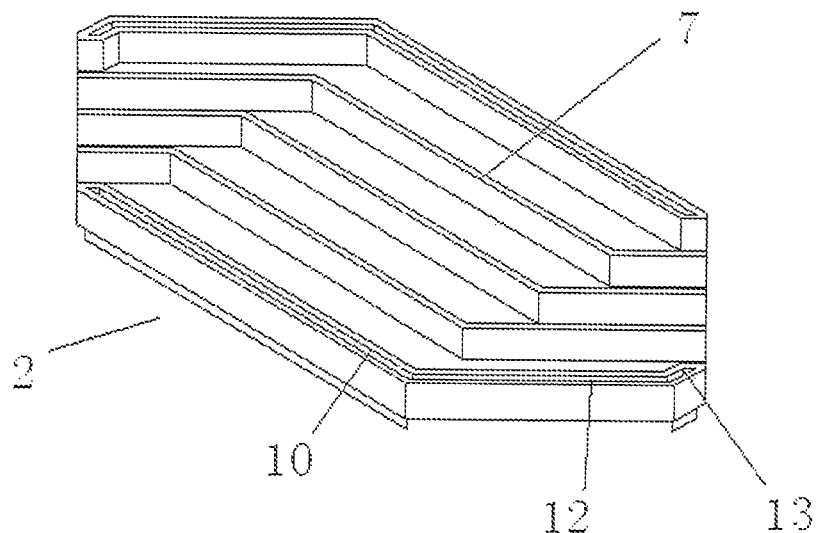
FIG. 7 is a schematic diagram I of the structure of the second heat exchange plate in Example 2 according to the present invention.
Figure 8:
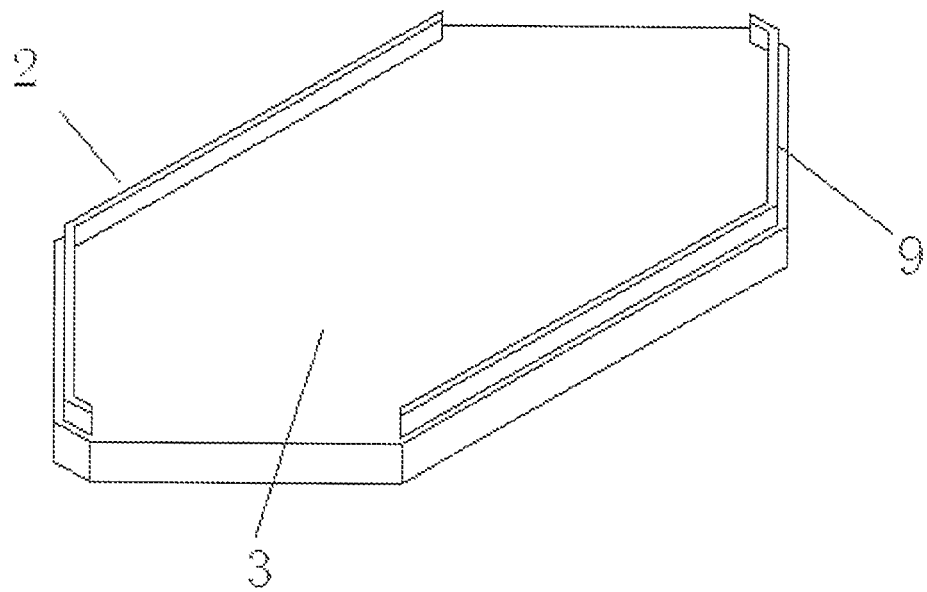
FIG. 8 is a schematic diagram II of the structure of the second heat exchange plate in Example 2 according to the present invention.
Figure 9:
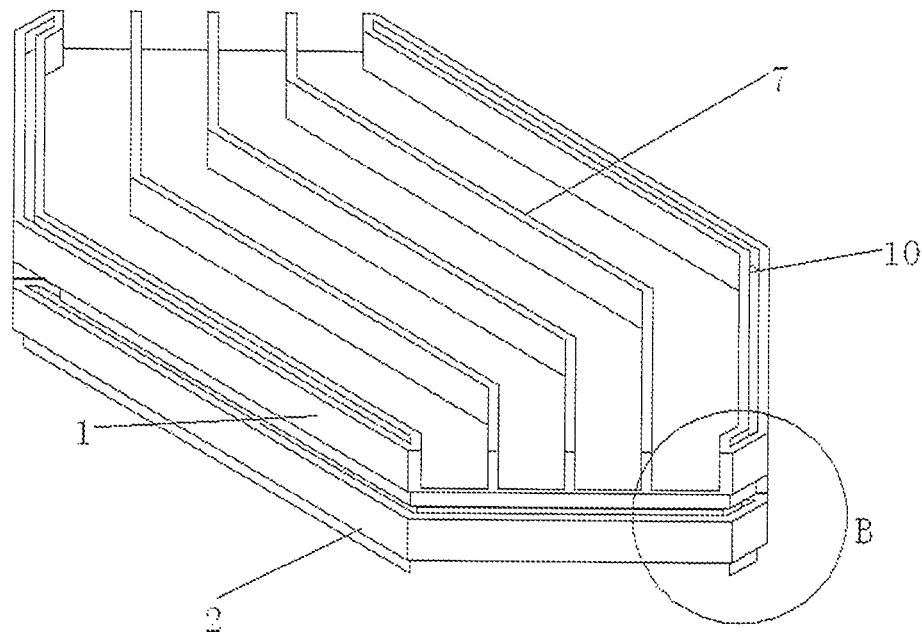
FIG. 9 is a schematic diagram of the structure of the connection between the first heat exchange plate and the second heat exchange plate according to the present invention.
Figure 10:
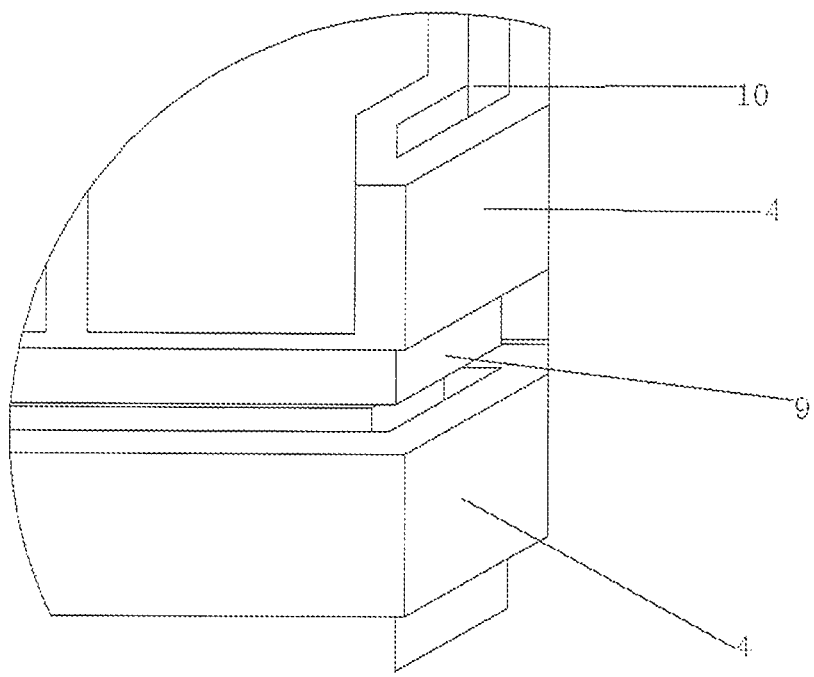
FIG. 10 is a partially enlarged view of Location B in FIG. 9.

FIG. 5 is a schematic diagram I of the structure of the first heat exchange plate in Example 2; FIG. 6 is a schematic diagram II of the structure of the first heat exchange plate in Example 2; FIG. 7 is a schematic diagram I of the structure of the second heat exchange plate in Example 2; FIG. 8 is a schematic diagram II of the structure of the second heat exchange plate in Example 2; FIG. 9 is a schematic diagram of the structure of the connection between the first heat exchange plate and the second heat exchange plate, and FIG. 10 is a partially enlarged view of Location B in FIG. 9. On the basis of the above example, it can be seen by referring to FIGS. 5 to 10 that the heat exchange sheet 3 may also be a hexagonal heat exchange sheet, and in this case, the guide grates 7 form a plurality of winding channels between the air inlet and the air outlet, but the specific shape of the guide grates is not defined, the shape of the guide grates 7 may be set to be along the direction of two sides of the hexagonal heat exchange sheet and parallel to the two sides.

By setting the heat exchange sheet 3 to be of a hexagonal structure, for the first heat exchange plate 1 and the second heat exchange plate 2, two molds need to be used to separately produce the first heat exchange plate 1 and the second heat exchange plate 2 in a specific production, such that the air inlets and the air outlets of the first heat exchange plate 1 and the second heat exchange plate 2 have different directions and are easy to install; in addition, the shape of the guide grates 7 is along two sides of the hexagonal heat exchange sheet and parallel to the two sides, then the overall shape of the guide grates 7 is made to be a N-like structure, and consequently the guide grate 7 itself has two angles, the employment of a hexagonal structure and a structure of the guide grate 7 that has angles can effectively extend the effective length of an air channel, ensure the energy exchange capacity of the air in the air channel, and further achieve the exchange of temperature and humidity of the heat exchanger, which improves the reliability and stability of the device use.

It can be seen by continuing to refer to FIGS. 5 to 10 that, in the situation that the heat exchange sheet 3 is hexagonal, the heat exchange frame 4 comprises a first frame 11 and a second frame 12 connected sequentially, the side end of the second frame 12 is further connected to a matching second folding edge 13, and a fixed angle is formed between the first frame 11 and the second frame 12 and between the second frame 12 and the second folding edge 13, while the specific angle of the fixed angle is related to the specific shape that has been set. Those skilled in the art may set a specific value for the fixed angle according to different shapes that have been set, which will not be described herein.

By setting the heat exchange frame 4 to be a structure that comprises the first frame 11, the second frame 12 and the second folding edge 13, it can effectively realize the protection of the side ends and corners of the heat exchange sheet 3, and make the snap groove 10 disposed on the heat exchange frame 4 and the snap projection 9 matching with the snap groove 10 to have a similar structure as well, the employment of the snap groove 10 and the snap projection 9 having such a structure can effectively ensure the stability and reliability of connection, ensure the airtightness and stability of connection, and prevent the heat exchange sheet 3 from being damaged, which effectively improves the safety and reliability of the device use.

The heat exchanger structure, regardless of the shape thereof, further comprises a top end plate disposed on the top end of all heat exchange sheets 3 and a bottom end plate disposed on the bottom end of all heat exchange sheets 3; by providing the top end plate and the bottom end plate, the top end and bottom end of heat exchange plates can be effectively protected, which prevents the heat exchange plates from being damaged during installation or after a long period of use, improves the reliability of the device use, extends the service life of the device, and is favorable for market promotion and applications.

In a specific application, for a heat exchanger structure in which the heat exchange sheet 3 is square and the number of the guide grates 7 is three, or for a heat exchanger structure in which the heat exchange sheet 3 is rhombic and the number of the guide grates 7 is three, or for a heat exchanger structure in which the heat exchange sheet 3 is hexagonal and the number of the guide grates 7 is three, they all comprise a plurality of the first heat exchange plates 1 and the second heat exchange plates 2 that are connected at an interval, namely a number of the first heat exchange plates 1 and the second heat exchange plates 2 are connected sequentially at an interval, the first air channel 5 and the second air channel 6, each of which has the air inlet and the air outlet in different directions, are formed between two connected heat exchange plates, wherein, for a square heat exchange sheet 3, four linear channels are formed between the air inlet and the air outlet through the guide grates 7, namely, the number is four for either the first air channel 5 or the second air channel 6; the first air channel 5 and the second air channel 6 form a 90° preset angle; for a hexagonal heat exchange sheet 3, four winding channels are formed between the air inlet and the air outlet by setting three guide grates 7, the first air channel 5 and the second air channel 6 form a preset angle, two air flows in different directions circulate in the first air channel 5 and the second air channel 6, respectively, without contacting each other, which further achieves the exchange of temperature and humidity and is environmentally friendly and healthy, wherein, for the heat exchange plates, the first heat exchange plate 1 and the second heat exchange plate 2 each comprises a heat exchange sheet 3 and a heat exchange frame 4 disposed on side ends of the heat exchange sheet 3, while the heat exchange sheet 3 is made of aluminum foil, paper or plastic film; for a heat exchanger with a rhombic structure, just like the above structure, those skilled in the art may set up by referring to the above structural features, which will not be described herein.

Wherein, for the connection structures of the first heat exchange plate 1 and the second heat exchange plate 2, they are connected mainly through the snap connection between the snap projection 9 and the snap groove 10, and specifically, each heat exchange plate is provided with a heat exchange frame 4, the heat exchange frame 4 is formed with a snap groove 10, a snap projection 9 is provided on the side of the heat exchange sheet 3 that is away from the heat exchange frame 4 for matching with the snap groove 10. In a specific installation, the snap projection 9 is inserted into the snap groove 10 to realize mechanical fixing and sealing, the connection is stable and reliable, and has good airtightness; consequently, the first air channel 5 and the second air channel 6 having air inlets and outlets can be formed between the first heat exchange plate 1 and the second heat exchange plate 2.

In a specific installation process, moreover, to ensure stability and reliability of the connection, a number of mechanical installation holes may be further formed on the heat exchange frame 4, and mechanical parts are used for fixing when the device is assembled; furthermore, positioning and connection rods may be provided at four corners formed by the heat exchange frame 4, for positioning and connection of a number of the heat exchange sheets 3 that are connected to each other, wherein the position and number of the positioning and connection rods are not defined, which may be disposed at the corners of the heat exchange frame 4 and the center of the heat exchange sheet, or disposed at the center of each side and corners of the heat exchange frame 4. As the position is different, the number of the positioning and connection rods varies accordingly. Those skilled in the art may set up according to specific actual need, as long as a stable connection of a number of the heat exchange sheets 3 can be achieved, which will not be described herein; by providing mechanical installation holes and positioning and connection rods, it effectively ensures stability and reliability of the connection, and extends the service life of the device.

Furthermore, matching top end plates and bottom end plates are further disposed on the top end and the bottom end of the first heat exchange plate 1 and the second heat exchange plate 2 that have been assembled and connected, the top end plates and bottom end plates may be any one of plastic plate, metallic plate and thermal insulation plate. Those skilled in the art may further select other types of top end plates and bottom end plates, as long as they can effectively ensure that it is not easy to damage the device and the overall appearance of the device is beautiful and elegant.

Lastly, the heat exchange sheet 3 is made of a heat exchange film, while all other parts in the device, such as the guide grates 7 and the heat exchange frame 4, are made of other plastic materials, such as ABS, PP, PE or PVC, and the heat exchange sheet 3 and other parts are injection molded into an integral structure; in specific operations, in the process of molding the heat exchange plates (including the first heat exchange plate 1 and the second heat exchange plate 2), the heat exchange film is first laid in a preset mold for injection molding, then other parts disposed on the heat exchange sheet 3 (including the guide grates 7, the heat exchange frame 4, the snap projection 9, and the snap groove 10 disposed on the heat exchange frame 4 for engaging with the snap projection 9) are all directly injection molded on the heat exchange film to form the heat exchange plate, which can effectively ensure the sealed connection between the heat exchange sheet 3 and other parts, and is easy to control the shape of the heat exchange sheet 3.

The heat exchanger according to the present invention puts a number of the first heat exchange plates 1 and the second heat exchange plates 2 in interference connection through the engagement between the snap projection 9 and the snap groove 10, and further makes the snap projection 9 and the snap groove 10 to have a folding edge structure through the structure of the heat exchange frame 4 that has folding edges, which effectively ensures stability and reliability of the connection, ensures the airtightness of the connection, reduces the operating complexity due to sealing through a sealing glue or sealing strip according to the prior art, and avoids the situation in which the device appearance becomes unsightly due to the leakage of the sealing glue or movement of the sealing strip; in addition, a number of first air channels 5 and second air channels 6 are formed through the guide grates 7, and the first air channels 5 and the second air channels 6 form a preset angle through the characteristics of the channels formed between the guide grates 7 and the air inlets and the air outlets, which effectively ensures that the air of different qualities in different areas flows in different air channels, is healthy and environmentally friendly, and by disposing top end plates and bottom end plates on the top end and the bottom end, and positioning and connection rods for running through the top end plates and bottom end plates, it effectively ensures that the top end and the bottom end of the device are not easy to be damaged, and further makes the structure of connection between a number of the first heat exchange plates 1 and the second heat exchange plates 2 more compact, which effectively improves the stability and reliability of connection between the first heat exchange plates 1 and the second heat exchange plates 2, extends the service life of the device, effectively improves the practicability of the device, and is favorable for market promotion and applications.

Lastly, it should be noted that the above examples are only used to describe, not to limit, the technical solutions of the present invention; although the present invention is described in detail with reference to the above examples, those skilled in the art should understand that they may still amend the technical solutions recorded in the above examples, or perform equivalent substitution on some or all technical features thereof; and these amendments or substitutions do not cause the essence of corresponding technical solutions to depart from the scope of the technical solutions in the examples of the present invention.

The invention claimed is:

1. A heat exchanger, comprising: a plurality of first heat exchange plates (1) and second heat exchange plates (2) that are connected sequentially and at an interval; wherein each of said first heat exchange plates (1) and said second heat exchange plates (2) each comprise: a heat exchange sheet (3); a heat exchange frame (4) disposed on side ends of the heat exchange sheet (3); and an air inlet and an air outlet being formed, respectively, on said heat exchange frame (4) formed as a result of the heat exchange frame upon the connection of a first heat exchange plate (1) to a second heat exchange plate (2); wherein said side ends of said heat exchange sheet (3) are formed with a projection (9) in a direction away from the heat exchange frame (4); wherein said heat exchange frame (4) is formed with a groove (10) opposite in direction from said projection for matching with the projection (9) of another heat exchange plate; wherein, along an axis defined by formed on each plate are not coextensive; and wherein said first heat exchange plates (1) and said second heat exchange plates (2) are in interference connection through the engagement between the projection (9) and the groove (10) and forms an air channel between said first heat exchange plate (1) and said adjacent second heat exchange plate (2), wherein the air inlet of the first heat exchange plate (1) and the air inlet of the second heat 2 exchange plate (2) have different directions, and wherein the air outlet of the first heat exchange plate (1) and the air outlet of the second heat exchange plate (2) have different directions.

2. The heat exchanger according to claim 1, characterized in that the air inlet and the air outlet of the first heat exchange plate (1) have the same direction, or the air inlet and the air outlet of the first heat exchange plate (1) have different directions.

3. The heat exchanger according to claim 2, characterized in that the first heat exchange plate (1) is provided with a number of guide grates (7), said number of guide grates (7) are connected to the air inlet and the air outlet, respectively, to form a plurality of linear channels (5) between the air inlet and the air outlet.

4. The heat exchanger according to claim 2, characterized in that the first heat exchange plate (1) is provided with a number of guide grates (7), said number of guide grates are connected to the air inlet and the air outlet, respectively, to form a plurality of winding channels between the air inlet and the air outlet.

5. The heat exchanger according to claim 1, characterized in that the air inlet and the air outlet of the second heat exchange plate (2) have the same direction, or the air inlet and the air outlet of the second heat exchange plate (2) have different directions.

6. The heat exchanger according to claim 5, characterized in that the second heat exchange plate (2) is provided with a number of guide grates (7), said number of guide grates (7) are connected to the air inlet and the air outlet, respectively, to form a plurality of linear channels (6) between the air inlet and the air outlet.

7. The heat exchanger according to claim 5, characterized in that the second heat exchange plate (2) is provided with a number of guide grates (7), said number of guide grates (7) are connected to the air inlet and the air outlet, respectively, to form a plurality of winding channels between the air inlet and the air outlet.

8. The heat exchanger according to claim 1, characterized in that the air inlet of the first heat exchange plate (1) and the air inlet of the second heat exchange plate (2) form a 90° angle, and the air outlet of the first heat exchange plate (1) and the air outlet of the second heat exchange plate (2) form a 90° angle.

9. The heat exchanger according to claim 1, characterized in that the first heat exchange plate (1) and the second heat exchange plate (2) each comprise a square heat exchange plate, a rectangular heat exchange plate, a rhombic heat exchange plate or a hexagonal heat exchange plate.

10. The heat exchanger according to claim 1 wherein said projection (9) and the groove (10) have a folding edge structure through the structure of the heat exchange frame (4) that has folding edges.

11. The heat exchanger according to claim 1 wherein said heat exchange sheet (3) is made of a heat exchange film, while all other parts in the heat exchanger are made of other plastic materials.

* * * * *